(12) United States Patent
Cantero Clares

(10) Patent No.: US 10,506,155 B2
(45) Date of Patent: Dec. 10, 2019

(54) IMAGE CAPTURING APPARATUS AND IMAGE STITCHING METHOD THEREOF

(71) Applicant: Acer Incorporated, New Taipei (TW)

(72) Inventor: Sergio Cantero Clares, New Taipei (TW)

(73) Assignee: Acer Incorporated, New Taipei (TW)

( * ) Notice: Subject to any disclaimer, the term of this patent is extended or adjusted under 35 U.S.C. 154(b) by 37 days.

(21) Appl. No.: 15/890,363

(22) Filed: Feb. 7, 2018

(65) Prior Publication Data

US 2018/0376059 A1 Dec. 27, 2018

(30) Foreign Application Priority Data

Jun. 22, 2017 (TW) .............................. 106120861 A

(51) Int. Cl.
*H04N 13/243* (2018.01)
*H04N 5/232* (2006.01)

(52) U.S. Cl.
CPC ..... *H04N 5/23238* (2013.01); *H04N 5/23229* (2013.01); *H04N 13/243* (2018.05)

(58) Field of Classification Search
CPC ............. H04N 5/23238; H04N 1/2112; H04N 13/243; H04N 5/23229; H04N 5/247; H04N 5/265; H04N 13/0239; H04N 13/0242; H04N 13/0051; H04N 2007/145; H04N 13/0278; H04N 5/3415; H04N 21/21805; G06T 7/13; G06T 7/70; G02B 27/017; G02B 27/0093; G02B 2027/0178; G02B 13/06; G02B 2027/0123; G02B 7/002; G06F 3/011; G06F 3/012; G06F 3/017; G06F 3/013; G06F 3/0346; A61B 5/6803; G03B 37/04; G03B 37/02
USPC ........................................................ 348/36
See application file for complete search history.

(56) References Cited

U.S. PATENT DOCUMENTS

| | | | |
|---|---|---|---|
| 2007/0081081 A1* | 4/2007 | Cheng | G06T 3/4038 348/218.1 |
| 2007/0132863 A1* | 6/2007 | Deguchi | G06T 3/4038 348/239 |
| 2010/0097442 A1* | 4/2010 | Lablans | G03B 5/00 348/36 |
| 2010/0097443 A1* | 4/2010 | Lablans | G03B 37/00 348/36 |

(Continued)

*Primary Examiner* — Nathnael Aynalem
(74) *Attorney, Agent, or Firm* — JCIPRNET

(57) ABSTRACT

An image capturing apparatus and an image stitching method there are provided, where the method includes the following steps. A scene is detected by using a first image sensor and a second image sensor of the image capturing apparatus to generate first photographing information and second photographing information. The scene is captured by the first image sensor according to the first photographing information and the second photographing information to respectively generate a first image and a first auxiliary image. The scene is captured by the second image sensor according to the second photographing information and the first photographing information to respectively generate a second image and a second auxiliary image. The first image and the first auxiliary image are fused, and the second image and the second auxiliary image are fused so as to obtain fused results corresponding to overlapping regions, and a stitched image is accordingly generated.

8 Claims, 5 Drawing Sheets

(56) References Cited

U.S. PATENT DOCUMENTS

2014/0118480 A1* 5/2014 Rimai .................. G06T 3/4038
                                                                       348/36
2014/0347501 A1* 11/2014 Ishida ................ H04N 5/23219
                                                                       348/207.1
2017/0148138 A1* 5/2017 Liu ...................... G06T 3/4038

* cited by examiner

IMAGE CAPTURING APPARATUS AND IMAGE STITCHING METHOD THEREOF

CROSS-REFERENCE TO RELATED APPLICATION

This application claims the priority benefit of Taiwan application serial no. 106120861, filed on Jun. 22, 2017. The entirety of the above-mentioned patent application is hereby incorporated by reference herein and made a part of this specification.

TECHNICAL FIELD

The disclosure relates to an image capturing apparatus and an image stitching technique thereof.

BACKGROUND

With development in technology, various smart image capturing apparatuses, such as tablet computers, personal digital assistants and smart phones, have become indispensable tools for people nowadays. Camera lenses equipped in high-end smart image capturing apparatuses provide same or better specifications and effects than those of traditional consumer cameras, and some even provide near-equivalent pixel qualities to those of digital single lens reflex cameras.

Using a panoramic camera as an example, images simultaneously captured by multiple camera lenses are concatenated by leveraging an image stitching technique to produce a larger scene image that would give a viewer an immersive experience. Since different camera lenses view a same scene from different angle of views so that the detected scene information would be slightly different and result in difficulty in image stitching. For example, when the sunlight comes from a direction closer to the left camera lens, exposure levels of images respectively captured by the left camera lenses and the right camera lenses would be different, and an obvious stitching line or unnatural color transition would appear in a resulting stitched image.

SUMMARY OF THE DISCLOSURE

Accordingly, an image capturing apparatus and an image stitching method thereof is proposed, where the quality of a stitched image is greatly enhanced.

According to one of the exemplary embodiments, the method is applicable to an image capturing apparatus having a first image sensor and a second image sensor and includes the following steps. A scene is detected by using the first image sensor and the second image sensor to generate first photographing info nation corresponding to the first image sensor and second photographing information corresponding to the second sensor. The scene is captured by using the first image sensor according to the first photographing information and the second photographing information to respectively generate a first image and a first auxiliary image, where each of the first image and the first auxiliary image include a first overlapping region. The scene is captured by the second image sensor according to the second photographing information and the first photographing information to respectively generate a second image and a second auxiliary image, where each of the second image and the second auxiliary image include a second overlapping region, and where the first overlapping region corresponds to the second overlapping image. The first image and the first auxiliary image are fused, and the second image and the second auxiliary image are fused so as to accordingly generate a stitched image.

According to one of the exemplary embodiments, the image capturing apparatus includes a first image sensor, a second image sensor, and a processor, where the first image sensor and the second image sensor are coupled to each other, and the processor is coupled to the first image sensor and the second image sensor. The first image sensor and the second image sensor are configured to detect a scene and capture images of the scene. The processor is configured to detect a scene by using the first image sensor and the second image sensor to generate first photographing information corresponding to the first image sensor and second photographing information corresponding to the second image sensor, capture the scene by using the first image sensor according to the first photographing information and the second photographing information to respectively generate a first image and a first auxiliary image, capture the scene by using the second image sensor according to the second photographing information and the first photographing information to respectively generate a second image and a second auxiliary image, fuse the first image and the first auxiliary image as well as fuse the second image and the second auxiliary image so as to accordingly generate a stitched image, where each of the first image and the first auxiliary image includes a first overlapping region, each of the second image and the second auxiliary image includes a second overlapping region, and the second overlapping region corresponds to the first overlapping region.

According to one of the exemplary embodiments, the method is applicable to an image capturing apparatus having only one image sensor and includes the following steps. A scene is detected by using the image sensor from a first angle of view to generate first photographing information corresponding to the first angle of view, and the scene is captured by using the image sensor from the first angle of view according to the first photographing information to generate a first image. The scene is detected by using the image sensor from a second angle of view to generate second photographing information corresponding to the second angle of view, and the scene is captured by using the image sensor from the second angle of view according to the second photographing information and the first photographing information to respectively generate a second image and an auxiliary image, where the first image includes a first overlapping region, each of the second image and the auxiliary image includes a second overlapping region, and the first overlapping image corresponds to the second overlapping region. The second image and the auxiliary image are fused to generate a fused result, and a stitched image is generated according to the first image, the fused result, and the second image.

According to one of the exemplary embodiments, the image capturing apparatus includes only one image sensor and a processor, where the processor is coupled to the image sensor. The image sensor is configured to detect a scene and capture images of the scene. The processor is configured to detect a scene by using the image sensor from a first angle of view to generate first photographing information corresponding to the first angle of view, capture the scene by using the image sensor from the first angle of view according to the first photographing information to generate a first image, detect the scene by using the image sensor from a second angle of view to generate second photographing information corresponding to the second angle of view, capture the scene by using the image sensor from the second angle of view according to the second photographing information and the first photographing information to respectively generate a second image and an auxiliary image, fuse the second image and the auxiliary image to generate a fused result, and generate a stitched image according to the first image, the fused result, and the second image, where the first image includes a first overlapping region, each of the second image and the auxiliary image includes a second overlapping region, and wherein the first overlapping image corresponds to the second overlapping region.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
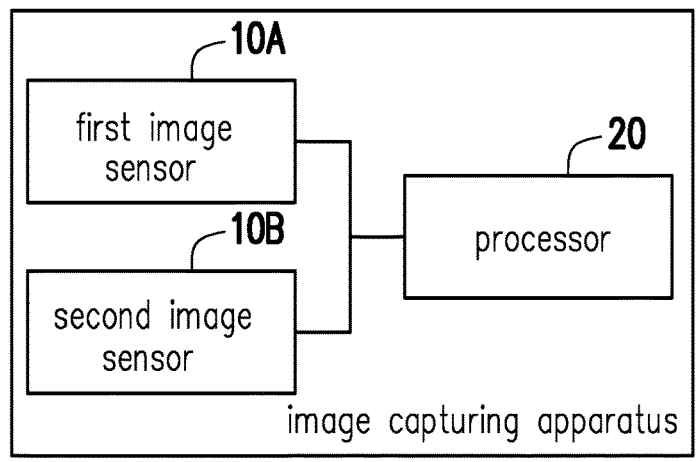
FIG. 1 illustrates a schematic diagram of an image capturing apparatus in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of an image capturing apparatus in accordance with one of the exemplary embodiments of the disclosure. All components of the image capturing apparatus and their configurations are first introduced in FIG. 1. The functionalities of the components are disclosed in more detail in conjunction with FIG. 2.

Referring to FIG. 1, an image capturing device 100 would include a first image sensor 10A, a second image sensor 10B, and a processor 20. In the present exemplary embodiment, the image capturing device 100 may be, for example, a digital camera, a single-lens reflex camera, a digital camcorder, or other devices with an image capturing feature such as a smart phone, a tabular computer, a personal digital assistant, a head-mounted display, and so forth. The disclosure is not restricted in this regard.

Each of the first image sensor 10A and the second image sensor 10B would respectively include a camera lens including a lens, an actuator, and a sensing element. The actuators may be stepping motors, voice coil motors (VCMs), piezoelectric actuators, or other actuators able to mechanically move the lenses. The sensing elements are configured to sense light intensity entering the lenses to thereby generate images. The sensing elements may be, for example, charge-coupled-device (CCD) elements, complementary metal-oxide semiconductor (CMOS) elements. The disclosure is not limited in this regard. It should be noted that, the first image sensor 10A and the second image sensor 10B would be coupled to each other and configured to transmit detected photographing information to each other. More details would be provided later on.

The processor 20 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD), other similar devices, circuits, or a combination of above-mentioned devices. The processor 20 would be coupled to the first image sensor 10A and the second image sensor 10B and configured to control overall operation of the image capturing apparatus 100.

It would be apparent to those skilled in the art that the image capturing apparatus 100 would further include a data storage device. The data storage device would be configured to store images and data and may be one or a combination of a stationary or mobile random access memory (RAM), a read-only memory (ROM), a flash memory, a hard drive or other similar devices or circuits.

Detailed steps of how the image capturing apparatus 100 performs the proposed image stitching method would be illustrated along with each component of the image capturing apparatus 100 hereafter.

Figure 2:
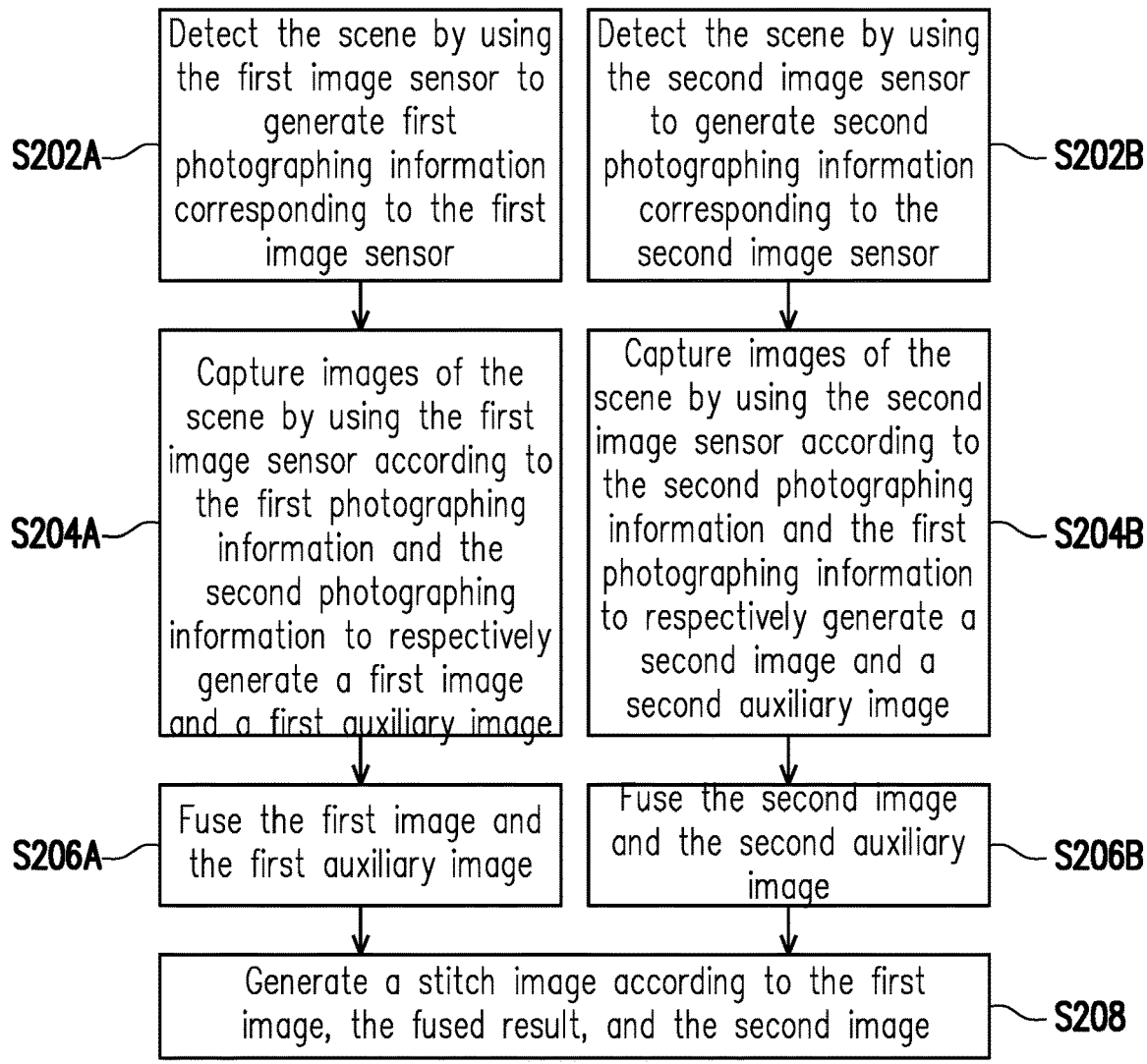
FIG. 2 illustrates a flowchart of an image stitching method of an image capturing device in accordance with one of the exemplary embodiments of the disclosure.

FIG. 2 illustrates a flowchart of an image stitching method of an image capturing device in accordance with one of the exemplary embodiments of the disclosure. The steps of FIG. 2 could be implemented by the image capturing apparatus 100 as illustrated in FIG. 1.

Referring to FIG. 2 along with FIG. 1, before the image capturing apparatus 100 captures images of a scene, the processor 20 would detect the scene by using the first image sensor 10A to generate first photographing information corresponding to the first image sensor 10A (Step S202A) and detect the scene by using the second image sensor 10B to generate second photographing information corresponding to the second image sensor 10B (Step S202B). The first photographing information may be related information analyzed from the scene detected by the first image sensor 10A by leveraging the 3A algorithm. The second photographing information may be related information analyzed from the scene detected by the second image sensor 10B by leveraging the 3A algorithm as well. In the present exemplary embodiment, the first photographing information and the second photographing information may be, for example, exposure level and color temperature.

Next, the first image sensor 10A and the second image sensor 10B would transmit the first photographing information and the second photographing information to each other, and the processor 20 would capture images of the scene by using the first image sensor 10A according to the first photographing information and the second photographing information respectively to generate a first image and a first auxiliary image (Step S204A) and capture images of the scene by using the first image sensor 10B according to the second photographing information and the first photographing information respectively to generate a second image and a second auxiliary image (Step S204B). Since the first image sensor 10A and the second image sensor 10B capture the same scene respectively from different angle of views, there would exist an overlapping region with same captured contents in each of the first image and the second image. Similarly, the first auxiliary image and the second auxiliary image are respectively same as the first image and the second image captured by the first image sensor 10A and the second image sensor 10B according to different photographing information, there would also exist an overlapping region in each of the first auxiliary image and the second auxiliary image same as that in the first image and the second image. For convenience purposes, the overlapping region in each of the first image and the first auxiliary image captured by the first image sensor 10A would be referred to as "a first overlapping region", and the overlapping region in each of the second image and the second auxiliary image captured by the second image sensor 10A would be referred to as "a second overlapping region".

An overlapping region in each two images would highly affect the quality of image stitching. To ensure natural continuity of image stitching, the processor 20 would fuse the first image and the first auxiliary image (Step S206A) and fuse the second image and the second auxiliary image (Step S206B) to obtain a fused result corresponding to the first overlapping region and the second overlapping region and thereby generate a stitch image according to the first image, the fused result, and the second image (Step S208). In other words, in the following up steps of image stitching, the portion corresponding to the original first overlapping region and the original second overlapping region would be replaced by the fused result. Since the fused result is generated based on all the photographing information detected by the two image sensors, an obvious stitching line or unnatural color transition would be prevented in the stitched image.

In detail, in terms of the first image sensor 10A, the processor 20 would perform fusing on the first overlapping region in the first image and the first overlapping region in the first auxiliary image, and in terms of the second image sensor 10B, the processor 20 would perform fusing on the second overlapping region in the second image and the second overlapping region in the second auxiliary image. Herein, the first overlapping region would include a first overlapping boundary line and a first stitching line, and the second overlapping region would include a second overlapping boundary line and a second stitching line, where the first stitching line in the first image and the second stitching line in the second image would be the seams for stitching the two images. For the first image, the processor 20 would replace a region between the first overlapping boundary line and the first stitching line by the fused result, and such region would be referred to as "a first fused overlapping region". For the second image, the processor 20 would replace a region between the second overlapping boundary line and the second stitching line by the fused result, and such region would be referred to as "a second fused overlapping region". The processor 20 would generate the stitched image according to the first image, the first fused overlapping region, the second fused overlapping region, and the second image. In the present exemplary embodiment, assume that an area of the first fused overlapping region is equal to that of the second fused overlapping region. That is, one half of the stitched overlapping region would be formed based on the first image, and the other half would be formed based on the second image. However, this is merely for illustrative purposes, the disclosure is not limited in this regard.

Figure 3:
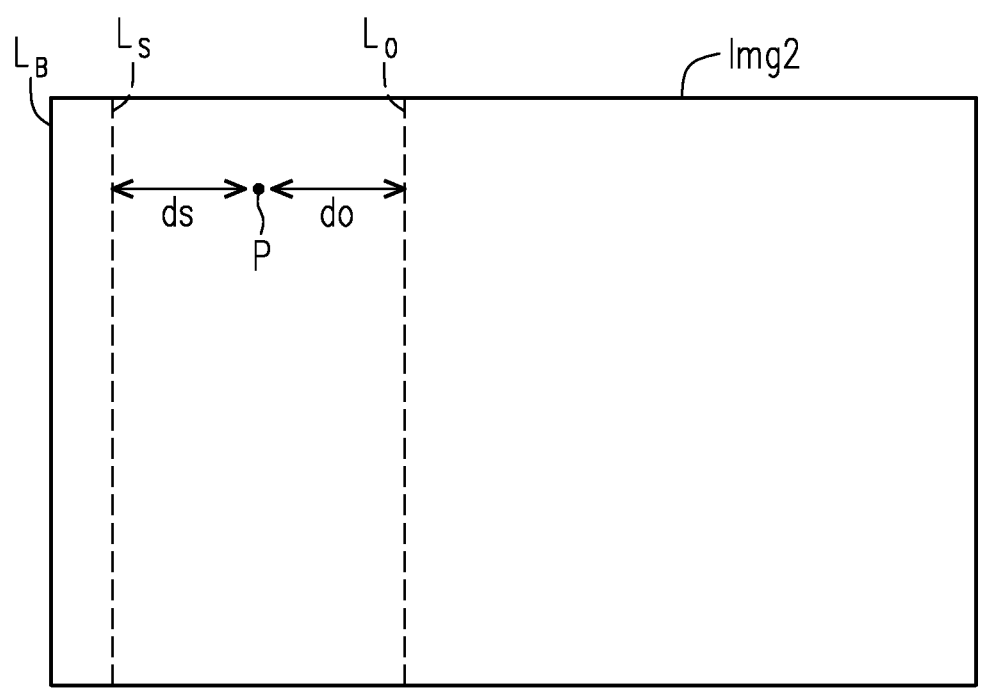
FIG. 3 illustrates a second image in accordance with an exemplary embodiment of the disclosure.

To be specific, FIG. 3 illustrates a second image in accordance with an exemplary embodiment of the disclosure to describe the steps of generating a second fused overlapping region, and the steps of generating a first fused overlapping region may be deduced in a similar fashion.

Referring to FIG. 3, a second image Img2 captured by the second image sensor 10B would include a second overlapping boundary line $L_O$, a second stitching line $L_S$, and a second image boundary line $L_B$. A region between the second overlapping boundary line $L_O$ and the second image boundary line $L_B$ would be a second overlapping region, and a region between the second stitching line $L_S$ and the second image boundary line $L_B$ would be a stitched region, where the stitched region would only be used for image stitching but would not appear in a resulting stitched image.

Herein, a region between the second overlapping boundary line $L_O$ and the second stitching line $L_S$ would be replaced by a second fused overlapping region. The processor 20 would perform image fusing on the same region respectively in the second image Img2 and a second auxiliary image (not shown) to generate the second fused overlapping region. For example, assume that a pixel P is a pixel in the second fused overlapping region. The processor 20 would calculate a distance $d_O$ between the pixel P and the second overlapping boundary line $L_O$ as well as a distance $d_S$ between the pixel P and the second stitching line $L_S$ to generate a second weighting ratio. Next, the processor 20 would calculate a weighted sum of a pixel value corresponding to the pixel P in the second image and a pixel value corresponding to the pixel P in the second auxiliary image according to the second weight ratio to generate a pixel value of the pixel P in the second fused overlapping region as follows, $$p_{x,y,O} = f_A(T(d_O), T(d_S)) \times p_{x,y,A} + f_B(T(d_O), T(d_S)) \times p_{x,y,B}$$

where $p_{x,y,O}$ is a pixel value of a pixel with a coordinate (x, y) in the second fused overlapping region, $p_{x,y,A}$ is a pixel value of a pixel with a coordinate (x, y) in the second auxiliary image captured by using the first photographing information of the first image sensor 10A, $p_{x,y,B}$ is a pixel value of a pixel with a coordinate (x, y) in the second image captured by using the second photographing information of the second image sensor 10B, T is a coordinate transfer function between the image capturing apparatuses, and $f_A$ and $f_B$ are arbitrary functions that satisfy $f_A(x,y) + f_B(x,y) = 1$.

Moreover, when the pixel P is on the second boundary line $L_O$ (i.e. $d_O=0$), which is also the furthest from the first image in the second fused overlapping region, the pixel value of the pixel P would be the closest to an original pixel value in the second image captured by using the second photographing information. On the other hand, when the pixel P is on the second switching line $L_S$ (i.e. $d_S=0$), the pixel value of the pixel P would be set according to its pixel values in the second image and in the second auxiliary image respectively captured based on the second photographing information and the first photographing information $$\left(\text{e.g. } p_{x,y,O} = \frac{p_{x,y,A} + p_{x,y,B}}{2}\right).$$

In the present exemplary embodiment, the processor 20 may generate the pixel value of the pixel P according to the following equation:

$$p_{x,y,O} = \frac{d_S(x) + d_O(x)}{d_S(x) + 2d_O(x)} \times p_{x,y,A} + \frac{d_O(x)}{d_S(x) + 2d_O(x)} \times p_{x,y,B}$$

Figure 4:
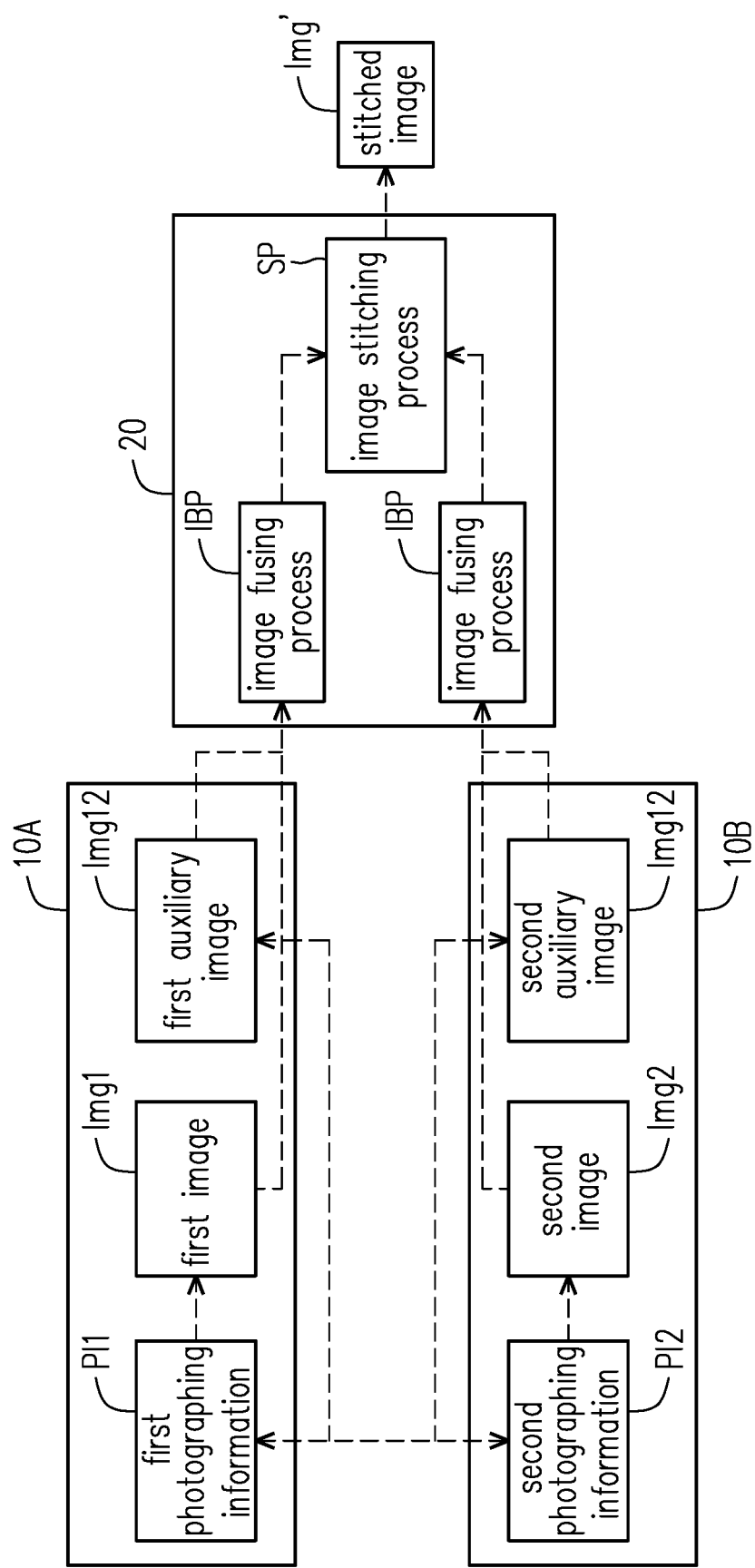
FIG. 4 illustrates a functional flowchart of an image stitching method of an image capturing device in accordance with one of the exemplary embodiments of the disclosure.

For better understanding, FIG. 4 illustrates a functional flowchart of an image stitching method of an image capturing device in accordance with one of the exemplary embodiments of the disclosure to integrate the aforementioned steps.

Referring to FIG. 4, the first image sensor 10A would detect a scene to generate first photographing information PI1, and the second image sensor 10B would detect the scene to generate second photographing information PI2. The first image sensor 10A would transmit the first photographing information PI1 to the second image sensor 10B, and the second image sensor 10B would transmit the second photographing information PI2 to the first image sensor 10A.

Next, the first image sensor 10A would capture an image of the scene according to the first photographing information PI1 to generate a first image Img1 and capture an image of the scene according to the second photographing information PI2 to generate a first auxiliary image Img12. The processor 20 would perform image fusing process IBP on the first image Img1 and the first auxiliary image Img12. On the other hand, the second image sensor 10B would capture an image of the scene according to the second photographing information PI2 to generate a second image Img2 and capture an image of the scene according to the first photographing information PI1 to generate a second auxiliary image Img21. The processor 20 would perform image fusing process IBP on the second image Img2 and the second auxiliary image Img21.

Next, the processor 20 would perform image switching process SP on the first image Img1, the second image Img2 along with a fused result to generate a stitched image Img'. The details of the steps may refer to the previous exemplary embodiments and would not be repeated hereinafter.

The aforementioned exemplary embodiments may be extended to an image capturing apparatus having three or more image sensors. When all the image sensors of the image capturing apparatus are collinearly arranged, an overlapping region in each image captured by any two neighboring image sensors may be used for concatenating a stitched image according to the flowchart illustrated in FIG. 2. On the other hand, when all the image sensors of the image capturing apparatus are not collinearly arranged (e.g. an image capturing apparatus configured to capture 360-degree panoramic images in the market), a joint overlapping region simultaneously captured by all the image sensors would be further considered for image switching.

Figure 5:
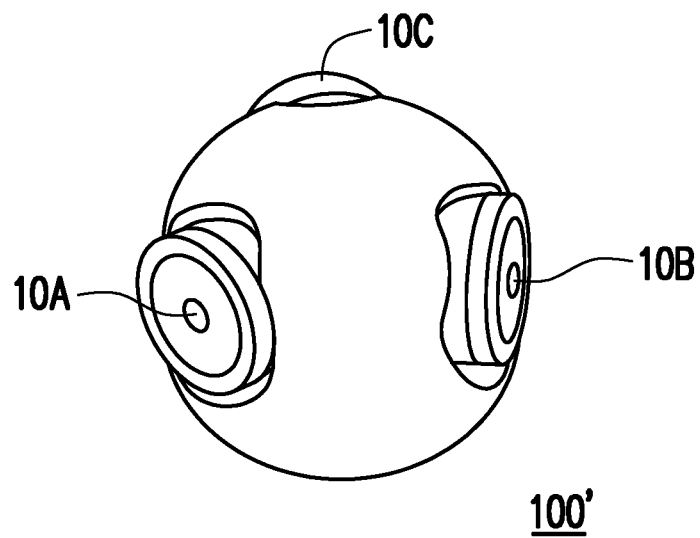
FIG. 5 illustrates a schematic diagram of an image capturing apparatus in accordance with another exemplary embodiment of the disclosure.

In detail, FIG. 5 illustrates a schematic diagram of an image capturing apparatus in accordance with another exemplary embodiment of the disclosure.

Referring to FIG. 5, an image capturing device 100' would include a first image sensor 10A, a second image sensor 10B, and a third image sensor 10C coupled to each other. In other words, the image capturing device 100' may be viewed as the image sensor 10C additionally configured in the image sensor 100, where the third image sensor 10C would be positioned between the first image sensor 10A and the second image sensor 10B but would not be collinear therewith. For simplicity, the positions of the first image sensor 10A, the second image sensor 10B, and the third image sensor 10C would be described as "left", "right", and "center" hereinafter.

Figure 6:
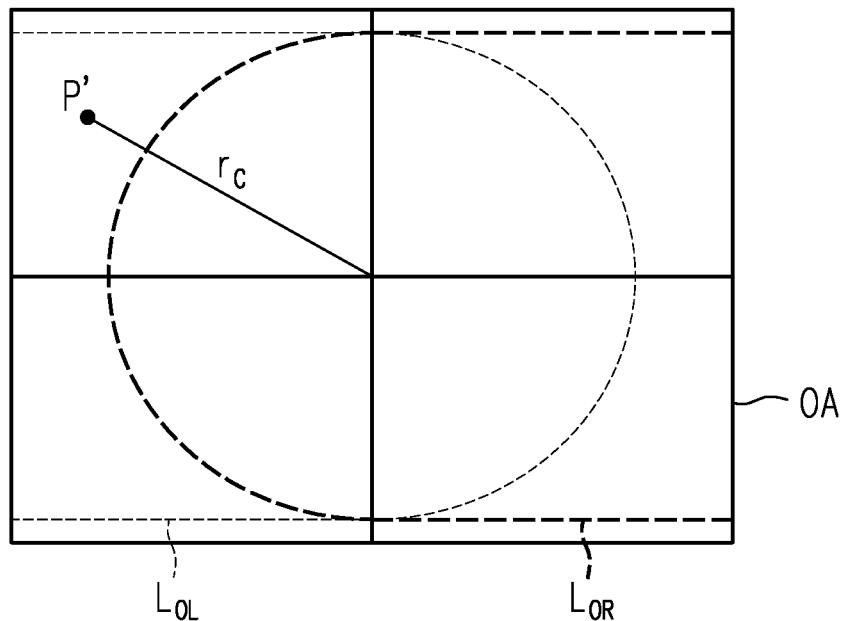
FIG. 6 illustrates a schematic diagram of overlapping regions in accordance with an exemplary embodiment of the disclosure.

In the present exemplary embodiment, an overlapping region in an image captured respectively by each of the first image sensor 10A and the second image sensor 10B for image switching would be performed based on the flowchart in FIG. 2. On the other hand, in terms of the third image sensor 10C, it would also detect the scene to generate third photographing information. Meanwhile, the third image sensor 10C would also receive the first photographing information and the second photographing information from the first image sensor 10A and the second image sensor 10B and capture images of the scene accordingly, where the captured images are referred to as a left auxiliary image and a right auxiliary image hereafter. Each of the third image, the left auxiliary image, and the right auxiliary image has an overlapping region with the first image (referred to as "a left overlapping region" hereafter), an overlapping region with the second image (referred to as "a right overlapping region" hereafter), and an overlapping region with both the first image and the second image (referred to as "a joint overlapping region" hereafter). FIG. 6 illustrates a schematic diagram of overlapping regions in accordance with an exemplary embodiment of the disclosure to explain a fused method of the overlapping regions.

Referring to FIG. 6, a region OA is a portion of the third image. A region of the left-hand side of $L_{OL}$ is the left overlapping region overlapped with the first image, and a region of the right-hand side of $L_{OR}$ is the right overlapping region overlapped with the second image, and the overlapping region of the left overlapping region and the right overlapping region is the joint overlapping region of the first image, the second image, and the third image. Moreover, in terms of a 360-degree spherical space, a switched region of each overlapping region may be, for example, within a range of 10 degrees. The processor 20 would fuse the left overlapping region by using the third image and the left auxiliary image, fuse the right overlapping region by using the third image and the right auxiliary image, and fuse the joint overlapping region by using the third image, the left auxiliary image, and the right auxiliary image. A pixel value of a fused pixel P' may be expressed by the following equation:

$$p_{x,y,O} = \sum_{i=0}^{N} f_i(T(x, y)) \times p_{x,y,i} =$$

-continued $$f_C(T(x, y)) \times p_{x,y,C} + f_L(T(x, y)) \times p_{x,y,L} + f_R(T(x, y)) \times p_{x,y,R}$$

where $p_{x,y,O}$ is a pixel value of a fused pixel with a coordinate (x, y), $p_{x,y,L}$ is a pixel value of a pixel with a coordinate (x, y) in the left auxiliary image captured by using the first photographing information, $p_{x,y,R}$ is a pixel value of a pixel with a coordinate (x, y) in the right auxiliary image captured by using the second photographing information, and $p_{x,y,R}$ is a pixel value of a pixel with a coordinate (x, y) in the third image captured by using the third photographing information. Also, T denotes a coordinate transfer function between a Cartesian coordinate system and a 360-degree spherical space.

In the present exemplary embodiment, the processor 20 may generate the pixel value of the pixel P' according to the following equations:

$$p_{x,y,O} = \begin{cases} p_{x,y,C} & x, y \notin O_L, x, y \notin O_R \\ \frac{\Gamma_C - r_C}{\Gamma_C - \Gamma_L} p_{x,y,C} + \frac{r_C - \Gamma_L}{\Gamma_C - \Gamma_L} \cdot p_{x,y,L} & x, y \in O_L, x, y \notin O_R \\ \frac{\Gamma_C - r_C}{\Gamma_C - \Gamma_R} p_{x,y,C} + \frac{r_C - \Gamma_R}{\Gamma_C - \Gamma_R} \cdot p_{x,y,R} & x, y \notin O_L, x, y \in O_R \\ \frac{2\Gamma_C - 2r_C}{2\Gamma_C - \Gamma_R - \Gamma_L} p_{x,y,C} + \frac{r_C - \Gamma_R}{2\Gamma_C - \Gamma_R - \Gamma_L} \cdot p_{x,y,R} + \frac{r_C - \Gamma_L}{2\Gamma_C - \Gamma_R - \Gamma_L} \cdot p_{x,y,L} & x, y \in O_L, x, y \in O_R \end{cases}$$

where $O_R$ is the right overlapping region, $O_L$ is the left overlapping region, and a region belongs to both $O_R$ and $O_L$ is the joint overlapping region. Also, r is a distance between the pixel P' and a center of the joint overlapping region, and $\Gamma_R$, $\Gamma_L$, and $\Gamma_C$ are a distance between the pixel P' and the right overlapping region silhouette, a distance between the pixel P' and the left overlapping region silhouette, and a distance between the pixel P' and the joint overlapping region silhouette respectively.

After all the overlapping regions are fused, the processor 20 would perform image switching by using the first image, the first fused overlapping region, the second image, the second fused overlapping region, the third image, and the fused result of the overlapping region, the left overlapping region, and the joint overlapping region the third image to generate a stitched image.

The aforementioned concept may be implemented to an image capturing apparatus with a single image sensor. In detail, FIG. 7A illustrates a schematic diagram of an image capturing apparatus in accordance with an exemplary embodiment of the disclosure.

Figure 7A:
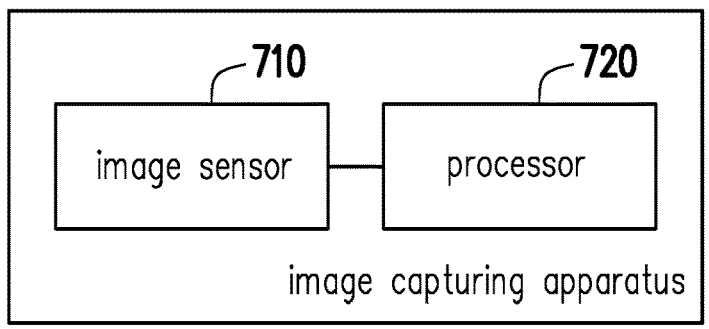
FIG. 7A illustrates a schematic diagram of an image capturing apparatus in accordance with an exemplary embodiment of the disclosure.

Referring to FIG. 7A, an image capturing apparatus 700 would include an image sensor 710 and a processor 720. In the present exemplary embodiment, structures and features of the image sensor 710 and the processor 720 would be similar to those of the image sensors 10A/10B and the processor 20 of the image capturing apparatus 100 in FIG. 1. Detailed descriptions may refer to related paragraphs and would not be repeated for brevity's sake.

Figure 7B:
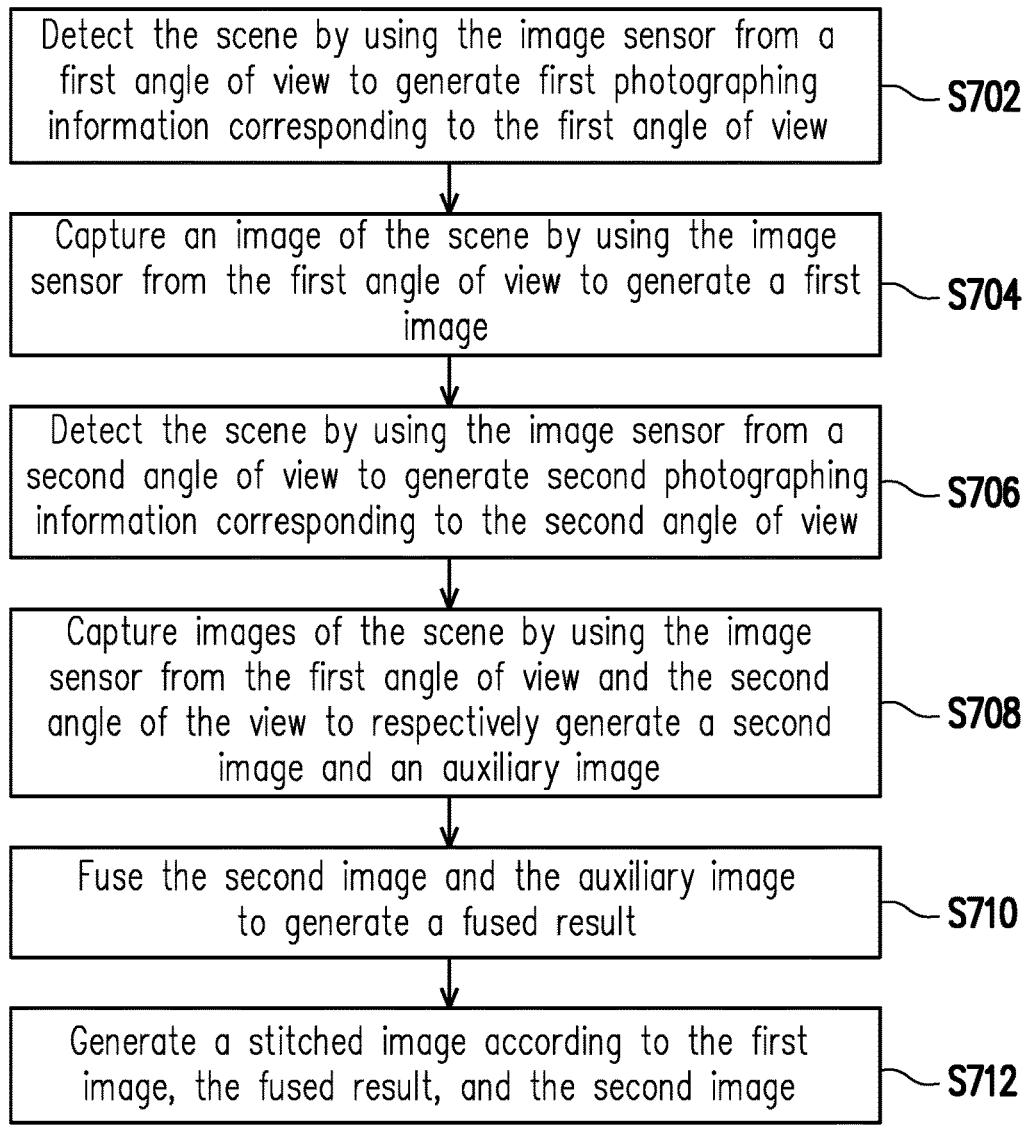
FIG. 7B illustrates a flowchart of an image switching method of an image capturing apparatus in accordance with an exemplary embodiment of the disclosure.

FIG. 7B illustrates a flowchart of an image switching method of an image capturing apparatus in accordance with an exemplary embodiment of the disclosure. The steps in FIG. 7B would be applicable to the image capturing apparatus 700 in FIG. 7A.

Referring to FIG. 7A and FIG. 7B, the processor 720 of the image capturing apparatus 700 would detect the scene from a first angle of view by using the first image sensor 710 to generate first photographing information corresponding to the first angle of view (Step S702) and capture an image of the scene from the first angle of view by using the image sensor 710 to generate a first image (Step S704). Next, the processor 720 would detect the scene from a second angle of view by using the image sensor 710 to generate second photographing information corresponding to the second angle of view (Step S706) and capture images of the scene by using the image sensor 710 according to the second photographing information and the first photographing information to respectively generate a second image and an auxiliary image (Step S708). In other words, the concept of capturing the second image of the scene from the second angle of the view by using the image sensor 710 is the same as that of capturing the second image of the scene by using the second image sensor 10B in FIG. 1, but the only difference is that the image capturing apparatus 700 in the present exemplary embodiment would be moved to a position corresponding to the second angle of view before the second image is captured.

Since the image sensor 710 captures the same scene from different angle of views, there would exist an overlapping region with same captured contents in each of the first image and the second image. Similarly, the auxiliary image is the same as the second image captured by the image sensor 710 according to different photographing information, there would also exist an overlapping region in the auxiliary image same as the ones in the first image and the second image. For convenience purposes, the overlapping region in the first image would be referred to as "a first overlapping region", and the overlapping region in each of the second image and the auxiliary image would be referred to as "a second overlapping region".

In the present exemplary embodiment, the processor 720 would fuse the second image and the auxiliary image to generate a fused result (Step S710). Different from the previous exemplary embodiment, the first overlapping herein would be discarded, and the second overlapping region would be replaced by the fused result. A weight ratio to fuse the second image and the auxiliary image may be based on a ratio of distances between a pixel and two overlapping boundary lines, and yet the disclosure is not limited in this regard. Next, the processor 720 would generate a stitched image according to the first image, the fused result, and the second image (Step S712).

In summary, as for the image capturing apparatus and the image stitching method thereof proposed in the disclosure, when images of a scene are captured by two image sensors with their respective photographing information as well as with others' photographing information, an overlapping region of each image captured with different photographing information would be fused for image stitching. As such, a resulting stitched image would look much closer to the scene, and obvious stitching lines or unnatural color transition would also be avoided for image quality enhancement. Moreover, the disclosure may also be implemented by an image capturing apparatus with a single image sensor, or three or more image sensors to provide more practical application.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image stitching method, applicable to an image capturing apparatus comprising a first image sensor and a second image sensor, wherein the method comprises steps of:
    detecting a scene by using the first image sensor and the second image sensor to generate first photographing information corresponding to the first image sensor and second photographing information corresponding to the second image sensor;
    capturing the scene by using the first image sensor according to the first photographing information and the second photographing information to respectively generate a first image and a first auxiliary image, wherein each of the first image and the first auxiliary image comprise a first overlapping region;
    capturing the scene by using the second image sensor according to the second photographing information and the first photographing information to respectively generate a second image and a second auxiliary image, wherein each of the second image and the second auxiliary image comprise a second overlapping region, and wherein the second overlapping region corresponds to the first overlapping region; and
    fusing the first image and the first auxiliary image, and fusing the second image and the second auxiliary image so as to accordingly generate a stitched image.

2. The method according to claim 1, wherein the step of fusing the first image and the first auxiliary image, and fusing the second image and the second auxiliary image so as to accordingly generate the stitched image comprises:
    fusing the first overlapping region in the first image and the first overlapping region in the first auxiliary image to generate a first fused overlapping region, and fusing the second overlapping region in the second image and the second overlapping region in the second auxiliary image to generate a second fused overlapping region; and
    generate the stitched image according to the first image, the first fused overlapping region, the second fused overlapping region, and the second image.

3. The method according to claim 2, wherein the first overlapping region comprises a first overlapping boundary line and a first stitching line, wherein the first overlapping region corresponds to a region between the first overlapping boundary line and the first stitching line, wherein the second overlapping region comprises a second overlapping boundary line and a second stitching line, and wherein the second overlapping region corresponds to a region between the second overlapping boundary line and the second stitching line.

4. The method according to claim 3,
    wherein steps of generating each first pixel in the first fused overlapping region comprises:
        calculating a distance between the first pixel and the first overlapping boundary line as well as a distance between the first pixel and the first stitching line to generate a first weight ratio; and
        calculating a weighted sum of a pixel value corresponding to the first pixel in the first image and a pixel value corresponding to the first pixel in the first auxiliary image according to the first weight ratio; and
    wherein steps of generating each second pixel in the second fused overlapping region comprises:
        calculating a distance between the second pixel and the second overlapping boundary line as well as a distance between the second pixel and the second stitching line to generate a second weight ratio; and
        calculating a weighted sum of a pixel value corresponding to the second pixel in the second image and a pixel value corresponding to the second pixel in the second auxiliary image according to the second weight ratio.

5. The method according to claim 1, wherein the image capturing apparatus further comprises a third image sensor, and wherein the method further comprises steps of:
    detecting the scene by using the third image sensor to generate third photographing information corresponding to the third image sensor;
    capturing the scene by using the third image sensor according to the third photographing information, the first photographing information, and the second photographing information to respectively generate a third image, a left auxiliary image, and a right auxiliary image, wherein each of the third image, the left auxiliary image, and the right auxiliary image comprises a left overlapping region associated with the first image, a right overlapping region associated with the second image, and a joint overlapping region associated with both the first image and the second image; and
    fusing the left overlapping region in the third image and the left overlapping region in the left auxiliary image, fusing the right overlapping region the third image and the right overlapping region in the right auxiliary image, and fusing the joint overlapping region in the third image, the joint overlapping region in the left auxiliary image, and the joint overlapping region in the right auxiliary image to generate a fused result associated with the third image.

6. The method according to claim 5, wherein the step of fusing the first image and the first auxiliary image, and fusing the second image and the second auxiliary image so as to accordingly generate the stitched image further comprises:

generating the stitched image by using the first image, the first fused overlapping region, the second fused overlapping region, the second image, the third image, and the fused result associated with the third image.

7. An image capturing apparatus comprising:

a first image sensor, configured to detect a scene and capture images of the scene;

a second image sensor, coupled to the first image sensor, and configured to capture images; and a processor, coupled to the first image sensor and the second image sensor, and configured to:

detect the scene by using the first image sensor and the second image sensor to generate first photographing information corresponding to the first image sensor and second photographing information corresponding to the second image sensor;

capture the scene by using the first image sensor according to the first photographing information and the second photographing information to respectively generate a first image and a first auxiliary image, wherein each of the first image and the first auxiliary image comprises a first overlapping region;

capture the scene by using the second image sensor according to the second photographing information and the first photographing information to respectively generate a second image and a second auxiliary image, wherein each of the second image and the second auxiliary image comprises a second overlapping region, and wherein the second overlapping region corresponds to the first overlapping region;

fuse the first image and the first auxiliary image, and fuse the second image and the second auxiliary image so as to accordingly generate a stitched image.

8. The image capturing apparatus according to claim 7 further comprising a third image sensor coupled to the first image sensor, the second image sensor, and the processor, wherein the processor is further configured to:

detect the scene by using the third image sensor to generate third photographing information corresponding to the third image sensor;

capture the scene by using the third image sensor according to the third photographing information, the first photographing information, and the second photographing information to respectively generate a third image, a left auxiliary image, and a right auxiliary image, wherein the third image, the left auxiliary image, and the right auxiliary image all comprise a left overlapping region associated with the first image, a right overlapping region associated with the second image, and a joint overlapping region associated with both the first image and the second image; and fuse the left overlapping region in the third image and the left overlapping region in the left auxiliary image, fusing the right overlapping region the third image and the right overlapping region in the right auxiliary image, and fusing the joint overlapping region in the third image, the joint overlapping region in the left auxiliary image, and the joint overlapping region in the right auxiliary image to generate a fused result associated with the third image.

* * * * *